Aug. 4, 1959   R. M. FELT   2,898,433
DE-ICING WINDOWS
Filed Aug. 29, 1956

INVENTOR.
Robert M. Felt
BY
Nobbe & Swope
ATTORNEYS

United States Patent Office 2,898,433
Patented Aug. 4, 1959

2,898,433

DE-ICING WINDOWS

Robert M. Felt, Toledo, Ohio, assignor to Libbey-Owens-Ford Glass Company, Toledo, Ohio, a corporation of Ohio Application August 29, 1956, Serial No. 606,899

5 Claims. (Cl. 219—20)

The present invention relates broadly to frangible electrical conductors. More particularly, it has to do with special glazing units incorporating transparent electrically conducting films, and with the prevention of electrical shocks therefrom during use.

Transparent films that are electrically conducting are well known, one of the most common forms of which is a product of the reaction of certain tin compounds on hot vitreous surfaces. While such films are capable of being used in any of a number of different ways, they have been proved to be particularly of value in the de-icing of windows or windshield of aircraft, automobiles, and motor vehicles. A number of ways in which these glazing units can be produced and employed in the prevention or removal of fog, frost or ice have been described in Patent No. 2,429,420, granted October 21, 1947, to Harold A. McMaster, in Patent No. 2,567,331, granted September 11, 1951, to Romey A. Gaiser, and in many others.

In addition to the extensive use of electrically conducting films in aircraft, they are more recently being proposed and developed for use in the windows and windshield of automobiles. The work done so far has shown that the films are ideally adapted to this field, but it has also shown that use of these films presents a potential threat of danger to the occupants of the automobiles in the form of electrical shock.

In normal use, however, because it is conventional, and in fact generally required, that laminated safety glass be employed in the glazing of windows of this type, and with the conducting film laminated inside the window it cannot be contained directly from the iniside or the outside of the vehicle, there is no danger of shock or electrocution to occupants of vehicle.

When, in case of an accident or for any other reason, the windshield becomes broken, parts of the electrically conducting film may be exposed and any person who comes into contact with this film while electrical current is being supplied thereto, may receive a severe shock. Especially in case of a collision, an occupant of the automobile may be thrown into, or through, the windshield and the resultant breaking of the glass and contact with the film may result in an electrical shock or possibly even electrocution.

It is therefore the primary object of this invention to eliminate the shock hazard in electrically heated windows or windshield.

Another object is the provision of means for automatically cutting off the flow of electrical current to a glazing unit of the character described herein upon breaking thereof.

Another object is the provision, in a window or windshield structure which includes a transparent electrically conducting film and an electrical circuit for supplying current to said film, of means interposed in the electric circuit for cutting off the flow of current to the film upon an increase of electrical resistance between the electrodes connected to said film.

Another object is the provision, in a window or windshield of the above type, of a current sensitive relay in series with the electrically conducting film which will act as an automatic switch and immediately turn off the electrical power to the film when the current through the relay is reduced below a certain minimum threshold value.

Still another object is the provision of a device for visually indicating when the electrical power source is connected to the conducting film and of means for operating this device.

Further objects and advantages of the invention will become more apparent during the course of the following description when taken in connection with the accompanying drawings.

In the drawings, wherein like numerals are employed to designate like parts throughout the same:

Figure 1:
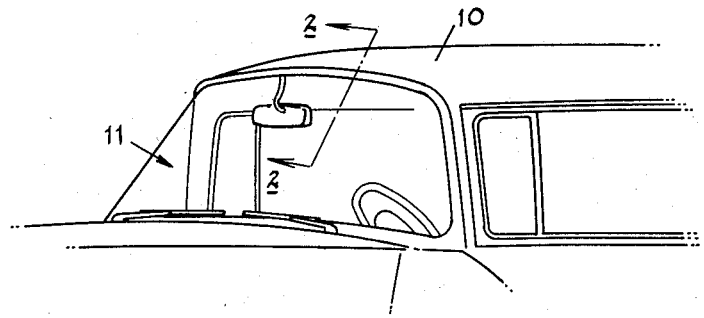
Fig. 1 is a fragmentary perspective view of the front end of an automobile.

Referring now more particularly to the drawings, there is illustrated in Fig. 1 a fragmentary front perspective view of an automobile 10 having a laminated safety glass windshield 11 which is of conventional construction with the exception that it is provided with a transparent, electrically conductive film in said lamination which when supplied with an electrical current provides de-icing or defrosting of the windshield, and is equipped with a special safety device for cutting the supply of current to the film upon breaking of said windshield.

Figure 2:
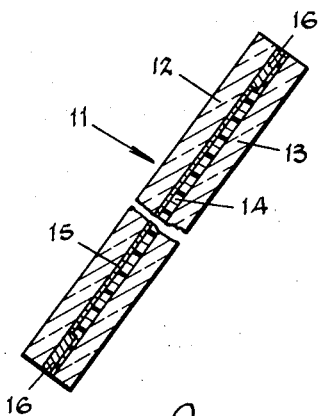
Fig. 2 is a generally vertical sectional view of through the windshield taken substantially along line 2—2 of Fig. 1.

As is shown more plainly in Fig. 2, the windshield is composed of two sheets of glass 12 and 13, laminated together with an interposed sheet of plastic 14. The outermost sheet, or outboard light 12, of the lamination is provided on its inner face with an electrically conductive film 15, and electrodes 16 that are arranged along the opposite margins of the sheet and in electrical contact with the film.

Suitable leads, not shown, may be soldered to the electrodes 16 for connection to a suitable electric power source 17 for supplying power to the film 15. The film may be any one of a number of known types now commonly used in aircraft windshields. As an example, a film may be produced on the glass sheet 12, prior to the laminating procedure, by spraying the sheet which has a temperature approximating the softening point of glass with a solution of stannic tetrachloride. Electrodes 16 may be any suitable material which will adhere tightly to the glass and carry an adequate amount of current to the film. A satisfactory electrode may be produced by applying a paste of silver and glass frit to the glass before it is heated and sprayed with the stannic tetrachloride. When this procedure is followed, the heating of the glass preparatory to filming it will also serve to fire the electrode paste into intimate contact with the glass.

Automobile windshields of the character just described have proved to be satisfactory in regard to deicing properties because, even in extremely low temperatures the supplying of current to the electrically conductive film would create a sufficient amount of heat to remove any ice that may have accumulated on the windshield, and to do this within a short space of time. Continued application of the power will also prevent any further formation of ice, fog or frost on the windshield.

Moreover, with a windshield of the present invention, breaking of the glass of the windshield with the consequent exposure of the electrically conducting film to contact by any person touching the windshield will create no hazard of electrical shock.

Figure 3:
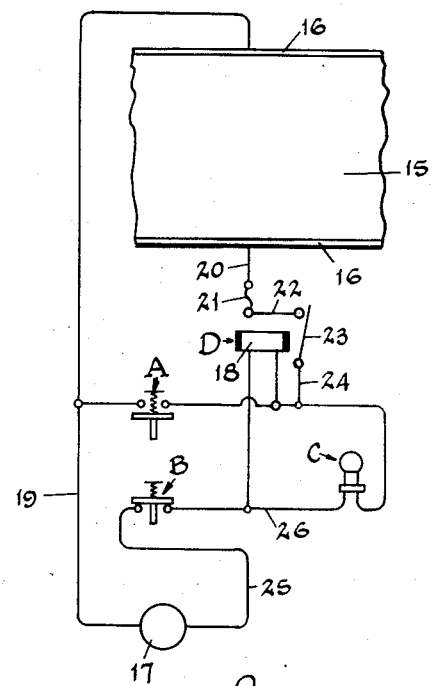
Fig. 3 is a wiring diagram for a preferred form of electrical circuit incorporating the safety feature of the invention.

Briefly stated, this last feature is made possible by the incorporation in the windshield assembly of a special safety device, already referred to, in which as shown in Fig. 3, it is designed to automatically disconnect the electrical power from the electrically conducting film through the instrumentality of a current control relay. This action being provided whenever the electrical resistance between electrodes 16 of film 15 increases beyond a predetermined value; to permit manual connecting and disconnecting of the film from its power source; and to give visual indication of such connection or disconnection.

Thus in the wiring diagram in Fig. 3, the indicated windshield 11 is provided with an electrically conducting film 15 and electrodes 16 already described. The electrodes 16 are connected to opposite sides of a suitable power source within the automobile, such as a generator, and interposed in the line between the film and the source of power are manual switches A and B, indication light C, and a current sensitive relay D connected in series with the film 15.

The manual switches A and B, which are adapted to respectively connect the film 15 with a source of power 17 and to disconnect therefrom, and the signal light C which is adapted to indicate whether or not power is being supplied to the film, may be mounted in any convenient location on the dashboard of the automobile.

When it is desired to de-ice or to prevent frost or fog formation of the windshield 11, this can be done by depressing manual switch A. This depression energizes the coil 18 of the current sensitive relay D and sets up a holding circuit for said relay coil from one side of the power supply 16 through wire 19, electrode 16, conductive film 15, electrode 16', wire 20, fuse 21, wire 22, relay points 23 (not closed), and wire 24. A circuit from the other side of the power source is maintained through wire 25, manual stop switch B, wire 26, and relay coil 18. The closing of relay points 23, in providing a holding circuit for relay coil 18, also maintains a circuit for providing electrical power to the windshield conducting film 15. Therefore at this time the conducting film 15, because of the current being drawn through it is heating, and thus is de-icing or preventing frost or fog formation.

While the windshield 11 is being supplied with current the signal light C, since it is wired in parallel with the current sensitive relay coil 18, will be lighted by means of wires 24 and 26. The light C will remain on as long as the windshield 11 is conducting current through its film 15, and will indicate to the occupant of the automobile that the windshield is so energized.

If it is desired by the occupant of the automobile to turn off or deenergize the windshield 11, this can be performed conveniently by depression of the manual stop switch B. Depression of stop switch B opens the circuit from the current sensitive relay coil 18 to one side on the power source 17. Deenergizing of coil 18 will cause contacts 23 to open up and be as shown in Fig. 3. Opening of contacts 23 breaks the holding circuit of coil 18 to the wire 19 side of the power source 17, and thus also disconnects the conductive film 15 from the power source 17 on its 16' electrode side. The windshield 11 will remain in a deenergized condition until manual start switch A is depressed once again.

However, in the event a windshield is broken by a collision of the automobile, or any other manner, while said windshield conductive film is being supplied with electric current, the film 15, as measured between electrodes 16, will suffer a consequent increase of electrical resistance. This increased resistance is reflected in the electrical circuit as a decrease in current through the coil 18 and film 15. Since this relay is specially designed to actuate its armature, and thus to close points 23, only when a current is supplied to the coil 18 in excess of a certain lower threshold value, the decrease of current below the threshold value will cause the relay armature to be released and points 23 to open. On the opening of points 23 the holding circuit to coil 18 and the electrical power to conductive film 15 are removed.

In order to further explain and demonstrate the operation, a calculation will be given of the decrease in electric current by a glass fracture of approximately 50% of the glass area. For this calculation there will be assumed to be a voltage of 115 v.a.c. impressed on film 15, and the electrical resistance of the conducting film will be 27.1 ohms. Therefore according to Ohms' law the current through the windshield will be, $$I=E/R$$
$$I=115/27.1$$
$$I=4.25 \text{ amps.}$$

If a fracture of the windshield 11 occurs which involves 50% of the glass area, the resistance of the film, as measured between electrodes 16, will be doubled and the current through the film 15 will consequently be decreased by 50% or reduced to 2.13 amperes. The particular current relay D that is being used will not operate on a current below 3.0 amperes. Therefore although the current sensitive relay D has a more than sufficient current (4.25 amperes) to operate it before the windshield 11 is broken, after the fracture of said windshield and a reduction of the current below 3.0 amperes, said relay will no longer operate.

In recapitulation, depression of manual start switch A will provide electrical power to the conductive film 15 of windshield 11 for the purpose of heating said film to remove ice, fog or frost from said windshield or to prevent the formation thereof. Also the depression of switch A energizes relay D which maintains the power to the windshield by means of a holding circuit, and indicates to the occupant of the automobile by means of signal light C that said windshield is energized. Upon fracture of windshield 11 and its film 15, the consequent increase in electrical resistance in the circuit of the current sensitive relay D causes it to open its points and thus to disconnect the electrical power from the windshield, and thus to remove the hazard of electrical shock or electrocution therefrom.

It is to be understood that the form of the invention herewith shown and described is to be taken as a preferred embodiment of the same, but that various changes in the shape, size, and arrangement of parts may be resorted to without departing from the spirit of the invention or the scope of the sub-joined claims.

I claim:

1. The combination, in a window or windshield, of a sheet of glass, a transparent electrically conducting film on a surface of said sheet, an electrical circuit for supplying current in excess of a threshold value to said film, electrode means for connecting said electrical circuit to said film, and means including a relay comprised of a coil and a pair of normally open switch contacts all electrically connected in series in said circuit, to close said switch contacts only when said current flow is in excess of said threshold value and to interrupt said circuit when said current flow is reduced below said threshold value by fracture of said glass sheet.

2. The combination as defined in claim 1, including additional switch means in said circuit for manually energizing and de-energizing said circuit at will.

3. A safety device for electrically interrupting the circuit to an electrically conducting filmed glass sheet to eliminate shock hazard upon a fracture of the sheet, which device includes a circuit for supplying a current in excess of a threshold value to said film and a relay interposed in said circuit, said relay being composed of a pair of normally open switch contacts and a coil, both electrically connected in series with said film and said coil being responsive only to a current flow in excess of said threshold value for moving and holding said switch contacts in circuit closing position.

4. A safety device connected in series with a transparent electrically conducting film covering the surface of a glass sheet and adapted to de-energize the electrical circuit to eliminate shock hazard upon a fracture of the glass sheet, which device includes an electrical circuit for supplying energy to the electrically conducting film on the surface of the glass sheet, current sensitive relay means interposed in said circuit responsive to variations in electrical resistance produced in the electrically conducting film on the glass sheet upon fracture of the sheet, the resistance being inversely proportional to the glass area covered by the film said relay means being adapted to break said circuit when the glass sheet is fractured, said current sensitive relay means including a manual start switch and a manual stop switch for connecting and disconnecting said circuit, and visual indicating means connected in series between the electrically conducting film and said current responsive relay means adapted to operate only when the electrically conducting film is energized.

5. A safety device as defined in claim 4, wherein the relay sensitive means includes a holding coil operable only when current is supplied thereto in excess of 3 amperes.

References Cited in the file of this patent
UNITED STATES PATENTS

| | | |
|---|---|---|
| 919,402 | Trumpler | Apr. 27, 1909 |
| 1,101,821 | Van Aller | June 30, 1914 |
| 1,803,787 | Bour | May 5, 1931 |
| 1,978,089 | Jones | Oct. 23, 1934 |
| 2,507,036 | McCrumm et al. | May 9, 1950 |
| 2,648,753 | Lytle | Aug. 11, 1953 |

OTHER REFERENCES

"Electrapane"; Litho. in U.S.A., September 1950, K–LOF; Libbey-Owens-Ford, Toledo 3, Ohio (4 pp.) 201/64 CP.

UNITED STATES PATENT OFFICE

CERTIFICATE OF CORRECTION

Patent No. 2,898,433                          August 4, 1959

Robert M. Felt

It is hereby certified that error appears in the printed specificatic of the above numbered patent requiring correction and that the said Letter Patent should read as corrected below.

Column 1, line 45, for "contained" read -- contacted --; same line, for "iniside" read -- inside --; column 3, line 36, for "not" read -- now --.

Signed and sealed this 5th day of January 1960.

(SEAL)
Attest:

KARL H. AXLINE
Attesting Officer

ROBERT C. WATSON
Commissioner of Patent